United States Patent
Chapman et al.

(10) Patent No.: US 7,260,079 B1
(45) Date of Patent: Aug. 21, 2007

(54) METHOD AND APPARATUS FOR DIRECTIONAL TRANSMISSION OF HIGH BANDWIDTH TRAFFIC ON A WIRELESS NETWORK

(75) Inventors: Peter William Chapman, Kanata (CA); Benedict Gerrard Bauer, Gloucester (CA); Ralph Thomas Carsten, Carp (CA)

(73) Assignee: Nortel Networks, Ltd., St. Laurent, QC (CA)

(*) Notice: Subject to any disclaimer, the term of this patent is extended or adjusted under 35 U.S.C. 154(b) by 1008 days.

(21) Appl. No.: 10/408,599

(22) Filed: Apr. 7, 2003

(51) Int. Cl.
   *H04Q 7/24* (2006.01)

(52) U.S. Cl. ............... 370/338; 370/335; 370/342; 370/347; 370/252; 370/280; 375/142; 375/146; 375/296; 455/442; 455/450

(58) Field of Classification Search ........... 370/335, 370/342, 347, 252, 280, 338; 455/442, 450, 455/451
   See application file for complete search history.

(56) References Cited

U.S. PATENT DOCUMENTS

| | | | |
|---|---|---|---|
| 5,933,781 A * | 8/1999 | Willenegger et al. ...... 455/522 |
| 5,949,814 A * | 9/1999 | Odenwalder et al. ...... 375/140 |
| 6,018,662 A * | 1/2000 | Periyalwar et al. ........ 455/442 |
| 6,078,576 A * | 6/2000 | Schilling et al. ............ 370/347 |
| 6,097,707 A * | 8/2000 | Hodzic et al. ............... 370/321 |
| 6,173,007 B1 * | 1/2001 | Odenwalder et al. ...... 375/146 |
| 6,219,341 B1 * | 4/2001 | Varanasi ..................... 370/252 |
| 6,222,832 B1 * | 4/2001 | Proctor ....................... 370/335 |
| 6,233,271 B1 * | 5/2001 | Jones et al. ................ 375/142 |
| 6,236,647 B1 * | 5/2001 | Amalfitano ................. 370/335 |
| 6,744,732 B1 * | 6/2004 | Pfenning et al. ........... 370/235 |
| 6,795,424 B1 * | 9/2004 | Kapoor et al. ............. 370/343 |
| 6,920,123 B1 * | 7/2005 | Shin et al. ................. 370/335 |
| 6,940,827 B2 * | 9/2005 | Li et al. ..................... 370/278 |
| 6,970,682 B2 * | 11/2005 | Crilly et al. ................ 455/78 |
| 7,020,110 B2 * | 3/2006 | Walton et al. ............. 370/334 |
| 7,050,480 B2 * | 5/2006 | Ertel et al. ................. 375/141 |
| 7,065,064 B2 * | 6/2006 | Chitrapu .................... 370/335 |
| 7,072,315 B1 * | 7/2006 | Liu et al. ................... 370/329 |
| 7,099,372 B2 * | 8/2006 | Nieczyporowicz et al. . 375/140 |

(Continued)

OTHER PUBLICATIONS

Nawrocki, et al., *Smart Antenna Techniques for WCDMA Systems*, (7 pages undated).

(Continued)

*Primary Examiner*—Marceau Milord
(74) *Attorney, Agent, or Firm*—John C. Gorecki

(57) ABSTRACT

A low data rate wireless channel (control channel) is associated with a high speed wireless channel (data channel). The data channel is divided into discrete code or time slots (access slots), that are unassigned to any particular recipient or user until requested. In the event that a particular user requires a particular resource, access slots are requested through the control channel, allocated to the user, and allocation information is passed back to the requesting user through the control channel. Direction and/or location information associated with the user is ascertained, through messaging with the user or by antenna sensing. This direction/location information is utilized to directionally broadcast requested resources toward the user to increase signal to noise ratios, reduce interference, and enable spectrum reuse within a cell. Optionally, the location information may also be used to adjust the transmitted power to further reduce interference in the cellular network.

19 Claims, 7 Drawing Sheets

U.S. PATENT DOCUMENTS

| | | | | |
|---|---|---|---|---|
| 7,103,026 B2 * | 9/2006 | Hall et al. | .................. | 370/335 |
| 7,146,172 B2 * | 12/2006 | Li et al. | .................. | 455/452.1 |
| 7,154,973 B2 * | 12/2006 | Hanada et al. | .............. | 375/354 |
| 7,164,669 B2 * | 1/2007 | Li et al. | ..................... | 370/336 |
| 7,177,298 B2 * | 2/2007 | Chillariga et al. | .......... | 370/348 |

OTHER PUBLICATIONS

Goldberg, *Adaptive Antenna Tutorial: Spectral Efficiency and Spatial Processing*, Fcc Office of Engineering and Technology, Sep. 7, 2001.

Intellicell, *Bringing Wireless to Life* (2 pages undated).

Intellicell *Smart Antenna Technology* (1 page undated).

Lozano, et al., *Lifting the Limits on High-Speed Wireless Data Access Using Antenna Arrays*, IEEE Communications Magazine pp. 156-162, Sep. 2001.

Ellingson, *Smart Antenna Technolgies*, IEEE Workshop on New & Emerging Technologies, Jan. 2001.

Miroslav, et al., Analysis of SDMA & Smart Antenna Techniques for Existing and New Mobile Communications Systems, (5 pages undated).

Godara, *Applications of Antenna Arrays to Mobile Communications, Part 1: Performance Improvement, Feasibility, and System Considerations*, Proceedings of the IEEE, vol. 85, No. 7, Jul. 1997, pp. 1031-1060.

Godara, *Applications of Antenna Arrays to Mobile Communications, Part II: Beam-Forming and Direction-of-Arrival Considerations*, Proceedings of the IEEE, vol. 85, No. 8, Aug. 1997, pp. 1195-1245.

1xEV: 1x Evolution IS-856 TIA/EIA Standard, Airlink Overview, QUALCOM, Nov. 2001.

* cited by examiner

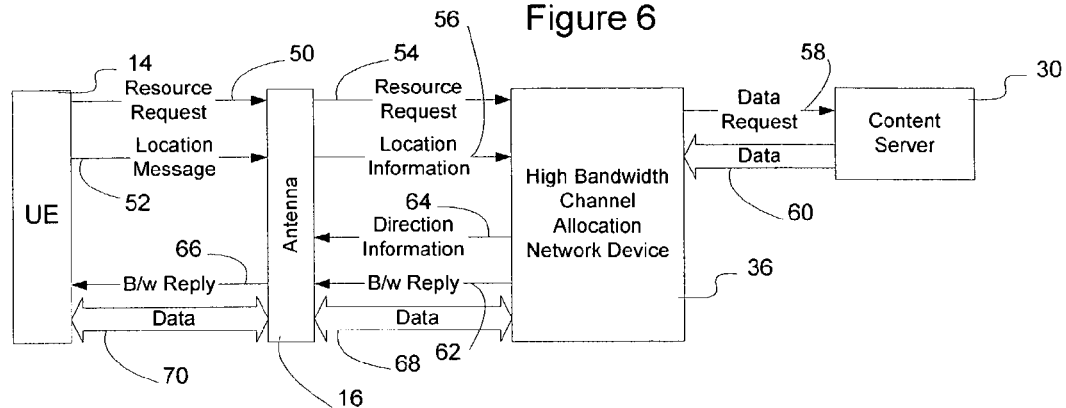
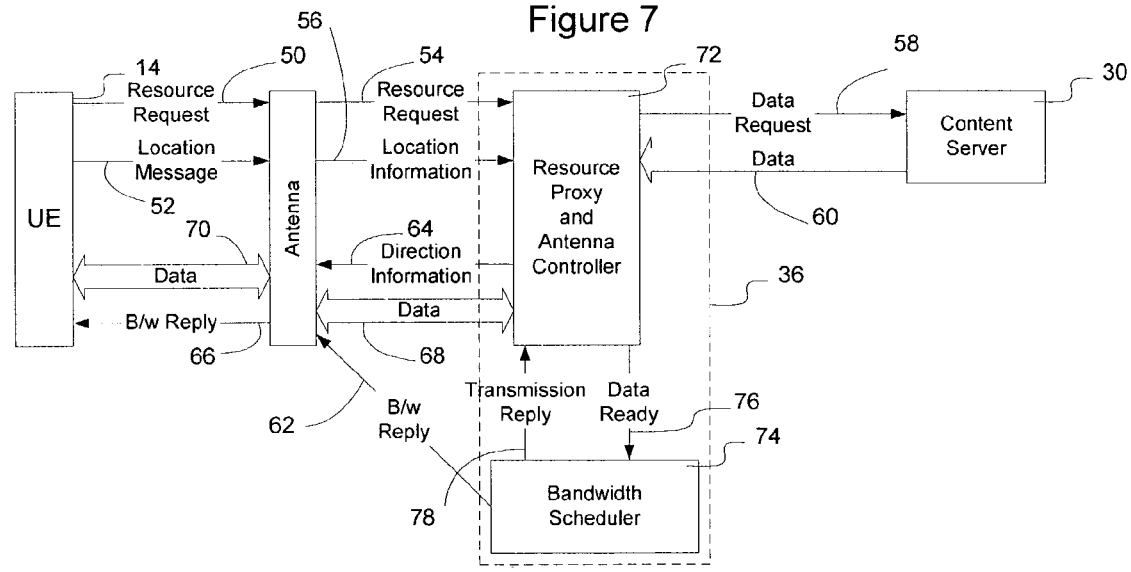

METHOD AND APPARATUS FOR DIRECTIONAL TRANSMISSION OF HIGH BANDWIDTH TRAFFIC ON A WIRELESS NETWORK

BACKGROUND OF THE INVENTION

1. Cross-Reference to Related Applications

This application is related to Utility patent application Ser. No. 10/324,908, filed Dec. 20, 2002, entitled METHOD AND APPARATUS FOR ACCOMMODATING HIGH BANDWIDTH DATA TRAFFIC ON A WIRELESS NETWORK, the content of which is hereby incorporated herein by reference.

2. Field of the Invention

The present invention relates to high bandwidth wireless communications and, more particularly, to a method and apparatus for enabling high bandwidth data transmissions over wireless communication networks.

3. Description of the Related Art

Wireless communication networks have been deployed in many areas. While these wireless communication networks have data rates sufficient to handle voice traffic, as higher bandwidth data-centric applications are deployed and implemented, the existing deployed technology base is likely to be unable to accommodate the increased demand in bandwidth.

There are currently two basic technologies in use in second generation wireless communications networks. In Europe, parts of the United States, and most of the rest of the world, wireless transmissions are based on a technology referred to as Time Division Multiple Access (TDMA). TDMA divides an available channel into time slots and interleaves multiple digital signals onto a single high-speed channel. One popular wireless technology based on TDMA is referred to as Global System for Mobile Communications (GSM). GSM is a circuit-switched system that divides each 200 kHz channel into eight 25 kHz time slots.

In the United States and certain parts of Asia, wireless transmissions are based on a technology referred to as Code Division Multiple Access (CDMA), which is a method for transmitting simultaneous signals over a shared portion of the spectrum. Unlike TDMA, which divides the spectrum into different time slots, CDMA's spread spectrum technique overlaps every transmission on the same carrier frequency by assigning a unique code to each conversation. After the speech codec (coder-decoder) converts the analog voice signal to a digital signal, the CDMA system spreads the digital voice stream over the full 1.25 MHz bandwidth of a CDMA channel, coding each stream separately so it can be decoded at the receiving end. All voice conversations thus use the full bandwidth at the same time. One bit is multiplied into 128 coded bits by the spreading techniques, providing the receiving side with a large amount of data that can be averaged to determine the value of each bit when correlated with the appropriate code.

GSM and (Interim Standard) IS-95A (code name for CDMA wireless currently deployed in the United States) are both optimized for voice transmission. Voice transmission is characterized by transmission that requires a relatively constant regular amount of bandwidth, but which is not particularly bursty. GSM and IS-95A are not optimized, however, for data transmission which tends to be very bursty with a relatively low average data rate.

Several transmission standards are in the process of being developed to enable wireless networks to be deployed that can accommodate higher bandwidth data transmissions as well as voice. In the TDMA-based wireless space, the evolving technology is Wideband CDMA (W-CDMA). W-CDMA is a third generation (3G) technology that increases data transmission rates in GSM systems by using a CDMA air interface instead of the TDMA interface. In the ITU's IMT-2000 3G specification, W-CDMA has become known as the Direct Sequence (DS) mode.

Universal Mobile Telecommunications System (UMTS) is the European implementation of W-CDMA that is planned to form the basis of the 3G wireless phone system in Europe. UMTS, which is part of IMT-2000, provides service in the 2 GHz band and offers global roaming and personalized features. The UMTS specification calls for support of multimedia data rates of up to 2 Mbps using the W-CDMA technology. In the meantime, General Packet Radio Service (GPRS), which modifies GSM to support data packets up to 114 Kbps, and Enhance Data Rates for Global Evolution (EDGE), which increases data throughput to 384 Kbps, are interim steps to speed up wireless data for GSM.

In the IS-95A CDMA space in use in the United States, the technology is evolving toward CDMA-2000, a 3G wireless technology that offers twice the voice capacity and data speed (up to 307 Kbps) on a single 1.25 MHz (1X) carrier in new or existing spectrum. CDMA2000 1X is also known as IS-2000, MC-1X and IMT-CDMA MultiCarrier 1X and 1xRTT (Radio Transmission Technology). The interim standard in the United States is IS-95B, which provides data capabilities up to 64 Kbps integrated with voice.

CDMA2000 1xEV is an evolution of CDMA2000 that provides higher speeds on a single 1.25 MHz channel. CDMA2000 may also be deployed in a 5 MHz channel, which is three times (3X) the carrier rate of CDMA2000 1X. CDMA2000 3X is also known as MC-3X, IMT-CDMA MultiCarrier 3X and 3xRTT.

While implementing one or more of these proposed protocols may, at some point in time, enable the simultaneous transmission of voice and data, obtaining the required licenses and upgrading or retrofitting existing networks will take time and a significant investment. Additionally, in many of these proposed standards, the high bandwidth data capabilities exist at the expense of the low-bandwidth voice services, e.g., to obtain 100 Mbps of data capacity the system may lose 100 Mbps or more of voice capacity.

Additionally, the delay associated with obtaining bandwidth for data bursts in many of the protocols is relatively high, due mainly to theoretical limitations associated with the physical medium and practical limitations associated with protocol implementation. On the downlink side where codes are allocated in line with the negotiated bandwidth, the problem is somewhat more severe because of the limit to codes that can be allocated. These delays may be disconcerting to an user, especially where the delays are inconsistent or unpredictable. Accordingly, it would be advantageous to have a high data rate burst mode transmission capability at a predictable delay that could be interleaved with voice services, while largely maintaining the network's voice capacity.

SUMMARY OF THE INVENTION

The present invention overcomes these and other drawbacks by enabling high bandwidth transmissions to take place over wireless networks. According to one embodiment, an association is formed between two or more wireless channels to identify, authenticate, allocate, and authorize high bandwidth traffic to or from a wireless network access point or an electronic device associated with the wireless network access point. A directional antenna, in connection with location information associated with the wireless network access point, is used to receive or transmit resources from/to the wireless network access point. While the invention will be discussed herein as supplementing second generation wireless networks, it may also advantageously be implemented in connection with third, fourth or higher generation wireless networks, and the invention is not limited to an implementation on existing second generation networks.

Establishing an association between two or more channels on two or more wireless links enables traffic on a high bandwidth channel to be controlled by signals on a control channel. Signaling on the control channel may include requests, scheduling, reporting (time to wait for download, progress monitor), ARQs (automatic requests for resends), reporting availability of service, indicating cell activity, and managing traffic downloads during handoffs. The association may be used to schedule delivery of resources in real-time with relatively low latency, or may be used to schedule transmissions to commence at a later time. Use of a control channel obviates the need to perform administrative functions on the high bandwidth channel, thus allowing the high bandwidth channel to be used wholly for data transmissions. Additionally, utilizing a control channel may be especially advantageous in connection with performing hand-offs (transfers of control from one cell to another) and coordinating transmission of data to user equipment network device(s) requesting access to the data channel over multiple data channels from adjoining cells.

Implementing the transmissions using a directional antenna or antenna array enables requested resources to be broadcast in the direction of the requesting wireless network access point, thus minimizing interference to transmissions in neighboring cells, as well as enabling spectrum reuse within the cell so that multiple users may receive data over the same spectrum simultaneously within the same cell without experiencing undue interference. By using a directional antenna to dynamically focus transmission to or reception from a given user, it is possible to improve the signal to noise and signal to interference ratios to thereby increase throughput, and hence available bandwidth.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 6-9 are system level diagrams illustrating signal transmissions between functional units according to embodiments of the invention;

DETAILED DESCRIPTION

Figure 1:
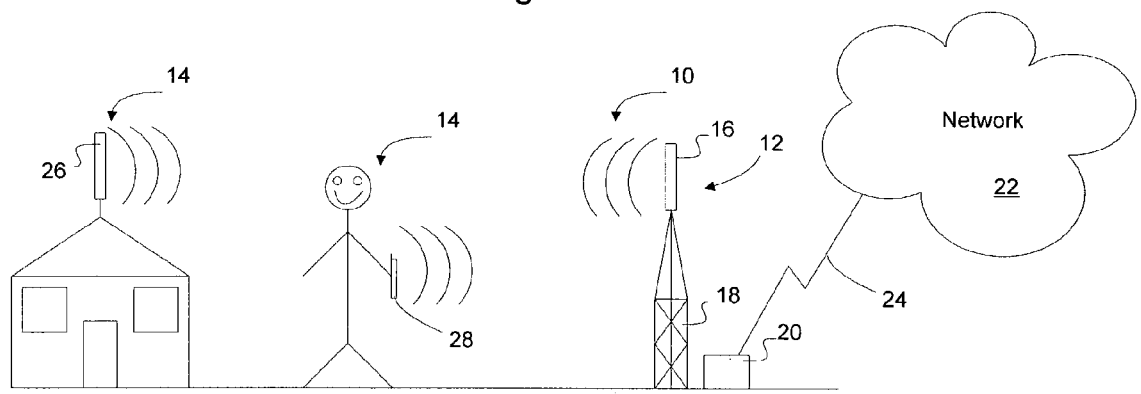
FIG. 1 is a functional block diagram of a wireless communications network according to an embodiment of the invention.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enables stochastic (unknown before the event) processes to be handled separately from data transmission by forming an association between two or more wireless channels on two or more wireless links. In one embodiment, stochastic processes are handled separately from data transmission on a low-bandwidth control channel and this control channel is used to schedule access to a high-speed data channel. By using a low-bandwidth channel to handle stochastic processes, and scheduling data transmissions on the high-bandwidth data channel independent of the stochastic processes, the high-bandwidth data channel may be used more efficiently to avoid lost access slots due to scheduling conflicts. By using a directional antenna to focus transmission to or reception from a given user, it is possible to improve the signal to noise and signal to interference ratios to thereby increase throughput, and hence available bandwidth. Additionally, utilization of a directional antenna enables spectrum reuse within a cell to enable simultaneous broadcasts to multiple users without causing undue mutual interference.

The channel configured to handle the stochastic processes, in one embodiment, is formed as an overlay to a second-generation network and includes an "always on" shared low data rate channel, similar to a control channel or pager channel. This channel will be referred to herein as the "control channel," although it may be used to transmit application data as well as perform the functions discussed herein.

This low data rate channel is associated with one or more high speed burst broadcast mode channels, which will be referred to herein as the "data channels." The control channel and the data channel are different wireless links, as the control and data channel, according to an embodiment of the invention, utilize different areas of the wireless transmission spectrum. For example, the control channel may be formed utilizing one frequency and the data channel may be formed using another transmission frequency. The invention is not limited to utilizing different frequencies as set forth in this example but rather extends to all implementations in which an association is formed between two separate wireless links.

Each data channel is divided into discrete frequency, code, or time slots (referred to herein as access slots), that are unassigned to any particular recipient, user, or group of users until requested. In the event that a particular user requires a particular service, access slots are requested through the control channel, allocated to the user, and allocation information is passed back to the requesting user through the control channel. Location information of the requesting user is obtained, either from the user e.g. via transmission of user Global Positioning System (GPS) information, or is determined by the antenna or antenna controller at the Base Transceiver Station (BTS). The requested data is broadcast in the requested access slots in the direction of the user using a directional antenna. Information on the data channel is then filtered and decoded by the user using access information associated with the access slots to obtain the requested service.

The control channel can be used to disseminate access information to enable users to have common, select, or private, access to broadcast information. The information disseminated in this instance may be information indicating that certain data is freely available on the data channel in a particular access slot or range of access slots. The access information may be transmitted over the control channel to individual users, or multiple access codes addressed to multiple users may be identified to the users and transmitted together in a string. Freely available information may include locality based push advertising, public information such as traffic reports, or any other information that may be of particular interest to wireless users. The advertising information may include coupons, may be geographically tailored such that particular wireless users are provided with access to advertisements that are geographically relevant to their present position, may include information about existing or available groupcast sessions, or any other form of information that is desirable to make available to an user.

If a modest level of security is desired and access is to be provided to a select group, the access information may also include access codes to enable only a particular group of users to have access to the broadcast information. This may be desirable, for example, where a particular user has requested to have access to information that is offered for an additional fee over the high-speed data channel, but which is otherwise not of sufficient value to justify expenditure of resources to encrypt and decrypt the information. Such broadcast information may include video clips, audio clips, and other information suitable for broadcast to a group of users.

If higher a higher level of security is required, such as for the exchange of private information, the access information may include encryption information to enable secure transmissions to be broadcast and understood by only intended users.

In operation, broadcast information such as video clips of sports events, news items, etc. may be groupcast on the data channel, and a select group of authorized users can access this groupcast information using access codes provided over the control channel. Private communications, which may include video teleconferencing, private file downloads, or optionally short duration video (video clips), can be encrypted and enabled in much the same way, such as by distributing a key to each mobile telecommunication unit requesting access to the private communications.

By diverting setup and control traffic to a low-bandwidth, always-on quasi real-time control channel, capacity on the data channel can be freed up to enable the high-speed channel to be dedicated to transmission of high-bandwidth traffic. Thus, the scarce high-bandwidth resources can be utilized to the full extent possible without requiring transmissions to stop to perform housekeeping functions between transmissions to individual users and avoids lost time slots due to scheduling conflicts.

By utilizing a dynamically configurable directional antenna, it is possible to focus the transmission in the direction of the requesting user during the allocated time slot to increase the signal to noise ratio and signal to interference ratio. Access slots allocated to common or groupcast information may be broadcast omni-directionally, whereas private information may be focused on the requesting user. By focusing transmission to/from a specified user, it is possible to simultaneously use the same access slot for multiple users located in geographic disparate directions from the base transceiver station without unduly causing interference on the multiple channels.

Control Channel

The low-bandwidth control channel may be used to handle many different functions. For example, the low-bandwidth control channel may be used to identify, authenticate, and authorize high bandwidth traffic to either the cellular terminal or to an associated terminal, computer, PDA, or other communication device. A cellular terminal, wireless access point, or other associated terminal, computer, PDA, or communication device will be referred to herein as "User Equipment" (UE). The control channel may also be used to set expectations as to the onset and duration of a requested download. For example, the control channel may convey count-down information (transmission to commence in 10, 9, 8, . . . seconds) to the requesting UE to enable the requesting UE to anticipate onset of the requested download and to synchronize the UE with the base transceiver station to enable the UE to activate its high bandwidth receiver at the correct time to receive the transmission.

Signaling on the control channel may include requests for bandwidth allocation or requests for access to broadcast information, scheduling information used to schedule data downloads or uploads, reporting information used to report the status of an upcoming, occurring, or completed transmission, ARQs (automatic requests for resends), reports relating to the availability of service, information indicative of the active cell, and information attendant to managing downloads of traffic during handoffs. Use of a control channel obviates the need for handoff at the high bandwidth broadcast mode channel. Specifically, a hand-off may be performed during access slots assigned to UEs to make the hand-off transparent to the UE and to not waste bandwidth on the high bandwidth data channel. Additionally, use of a control channel enables signals in the broadcast channel to be decoded (where appropriate) by more than one UE.

The control channel may also be used to communicate location information from the UE to the base transceiver station. For example, where the UE is configured with a Global Positioning System (GPS) antenna and software, the UE can transmit its current location (GPS coordinates) to the base transceiver station. Optionally, on a GPS-equipped user equipment, the UE may also transmit GPS history information to enable the BTS to take into account the relative motion of the UE. Signaling on the control channel may also include information about the requesting UE, such as the identity of the requesting UE, GPS or other location or direction information of the requesting UE, relative signal strengths of signals from adjoining cells, such as may be determined by the UE during mobile assisted handoffs, or any other information useful in enabling a transmitting BTS to discern the direction or location of the requesting UE.

As described in connection with FIG. 14 below, the UE may also utilize a self discovery mechanism to ascertain which direction of transmission from the BTS provides an acceptable signal. Information ascertained during the self discovery may be provided to the BTS to enable the BTS to transmit toward the UE in the direction selected by the UE.

Where the requesting UE does not have the capability to tell the BTS its present location, the direction of the incoming signal may be deduced by the antenna of the BTS using known methods and algorithms. Knowing the direction of the UE enables the BTS to cause the high bandwidth data channel to be directed at a specific UE during transmission of information to the UE over its assigned access slots.

Optionally, in addition to direction information, the antenna array may attempt to ascertain the amount of power that will be needed to transmit data back to the requesting UE. This may be done in a number of ways. For example, the antenna array may sense the received power and obtain the type and transmission power of the UE over the control channel. Knowing the transmission power and the received power will enable the BTS to calculate the attenuation between the UE and the BTS. This attenuation information may be used by the antenna array to adjust the transmitted power to use a sufficient, but not excessive, amount of power when transmitting data back to the UE. Utilizing less power is advantageous in the network as a whole as it reduces interference on other signals within the cell and on signals being used in adjoining cells.

Obtaining the distance information associated with a requesting UE may be done in a number of other ways. Where the UE is equipped with GPS, ascertaining the distance is straight-forward. Where the UE is not equipped with GPS, or the GPS system is not working or accessible for one reason or another, the distance between the UE and the BTS may be ascertained from the amount of time it takes signals to get propagate between the UE and BTS. For example, in one embodiment, the BTS may send out a control timing signal on the control channel requesting the UE 14 to immediately transmit a response indicating the arrival time of the control timing signal, and the transmission time of the response timing signal. Subtracting out the processing time yields the Round Trip Time (RTT) associated with transmission to and from the UE 14. This RTT may be used to calculate the distance from the BTS to the UE. For example, assuming the transmission speed of the signal is approximately $3 \times 10^8$ m/sec, it will take $3.3 \times 10^{-6}$ sec. for the signal to travel 1 km. Thus, a RTT of approximately 6.6 $\mu$sec. (after subtracting processing time) will indicate that the requesting UE is approximately 1 km from the BTS.

While several specific examples have been given as to various manners of ascertaining the distance or perceived attenuation between the BTS and the requesting UE, the invention is not limited to implementing one or more of these particular examples. Rather, according to the invention, by understanding the approximate power required to transmit a signal from the BTS to the requesting UE, the BTS may adjust its transmitted power to minimize interference with signals within the cell and within adjoining cells.

Ascertaining the approximate location of the UE may be advantageous for other reasons, aside from transmission considerations. For example, the BTSs may act as GPS transmitters to fill in GPS dead spots. Additionally, knowing the approximate location of the UE enables the mobile to be located in the event of an emergency. Accordingly, the BTS may utilize the direction and/or location information for any other additional purposes without departing from the scope of the invention, and the invention is not limited to utilization of direction and/or location information for transmission only.

The control channel may be implemented using any number of technologies. In one embodiment, the control channel is implemented as a cellular channel on a cellular network implemented according to any of the currently deployed wireless communications protocols, including but not limited to GSM, CDMA, or UMTS, or any future technologies.

The low-bandwidth control channel in this embodiment is configured to perform a number of Operation, Administration, and Maintenance/Control (OAM/Control) functions. Examples of OAM/Control functions that may be performed using the low band control channel include:

Allowing users to request wideband service;
Scheduling and managing wideband service;
Authenticating users, requests, or other information;
Obtaining location information from the requesting UE;
Distributing access, encryption, and decryption codes;
Advising users of status of requests, and download progress;
Allowing users to request resends of failed transmissions;
Allowing users to acknowledge successful downloads;
Monitoring UE location and requesting resends following cell handoffs;
Advising a requesting user of the cost associated with the requested service and other information associated with request;
Accepting and releasing the data channel;
Notifying users of negative requests where the requested resource does not exist, is not available, or contains no data; and
Obtaining information required to invoice for transmissions over the high bandwidth channel.

Additional or alternative functions may be performed using the control channel as well, and the invention is not limited to using a control channel to perform some or all of these particular listed OAM/Control functions.

Data Channel

The high bandwidth data channel is formed as a broadband broadcast mode channel that may be directed toward particular users, such as via a directional antenna, or may be simultaneously broadcast as a common signal to all users within the cell and optionally is also distributed to users in one or more other cells. This broadband broadcast mode may be implemented using any conventional wireless technology, having the ability to broadcast, multicast, or unicast data, including technologies designed to broadcast information in licensed spectra or in license exempt spectra.

In one embodiment, the high bandwidth data channel is implemented using Orthogonal Frequency Division Multiplexing (OFDM), a technique that transmits large amounts of digital data over a radio signal by splitting the radio signal into multiple smaller sub-signals that are then transmitted simultaneously at different frequencies to the receiver. In another embodiment, the high bandwidth data channel may be implemented in UMTS licensed spectrum, over 802.11 or other Wireless Local Area Network (WLAN) technology, such as HiperLAN, a broadband wireless technology operating in the 5 GHz frequency band. The invention is not limited to any one of these particular embodiments, but rather encompasses transmission in the data channel on any appropriate bandwidth.

The data channel may be organized in any desired fashion. In one embodiment, the data channel is organized to have a mixture of dedicated access slots and burst mode access slots. The dedicated access slots, in this embodiment, are reserved to be used for time sensitive traffic such as telephony and video. The burst mode access slots are provided to accommodate traffic bursts associated with typical data traffic such as web browsing, file downloads, and other bursty traffic.

Access slots on the data channel may be assigned based on any particular algorithm to take into account the particular transmission policies in place on the wireless network. For example, time critical applications may be given priority over other types of applications. The invention is not limited to any particular manner of prioritizing access slots. Additionally, the location or direction information of the intended recipients may be used in the scheduling to enable the antenna array to transmit data to recipients in close geometric proximity sequentially, This may minimize lag time between transmissions by minimizing adjustments required at the antenna array between broadcast intervals. Utilizing geographic and/or directional information in connection with scheduling access slots also enables the antenna array to transmit data to multiple recipients during the same access slots. Specifically, by choosing recipients in different geographic regions of the cell for simultaneous use of a single access slot, it is possible to reuse spectrum within the cell by focusing multiple directional transmissions in different directions at the same time, utilizing the same frequency, or utilizing the same code.

The high bandwidth data channel may be used for any number of applications. Wireless Virtual Private Networks (VPNs) may be established over the high bandwidth data channel. Standard data applications such as accessing the Internet, downloading private files, accessing e-mail messages, obtaining Short Message Service (SMS) messages or Multimedia Message Service (MMS) messages, participating in video telephone calls, or receiving streaming audio or video, may also be implemented. Additionally, location based services using time difference triangulation on the broadcast signal and uploading the result through the control channel, may be implemented on the embodiments of the invention. During periods of peak use, in one embodiment, the high bandwidth data channel may be used to transmit voice traffic as well to maximize the number of voice circuits on the wireless network. The invention is not limited to any particular technologies implemented for use over the high bandwidth wireless data channel.

In the embodiments disclosed herein, the data channel has been described as transmitting high bandwidth data from a base transceiver station to an user equipment network device. The invention is not limited in this regard, however, as it may also be used to schedule transmission of high bandwidth data from the user equipment network device to one or more base transceiver stations. Additionally, although the invention has been described as using a control channel to schedule transmissions on one high-bandwidth channel, the invention is not limited in this regard, as a control channel may be used to schedule transmissions on more than one high-bandwidth channel.

For example, a particular user may desire to use one data channel for access to a wireless LAN via 802.11, another wireless data channel to participate in a video teleconferencing, and a third wireless data channel to monitor information such as the stock market or sports scores. Additionally, the user may require a separate wireless data channel for transmission of files or documents to other users on the network. All of these wireless data channels may be controlled on the control channel and may be terminated at a single or at multiple pieces of equipment. The invention is not limited to the embodiments set forth herein but rather extends to any such embodiment that associates a low-bandwidth wireless control channel with one or more high-bandwidth data transmission channels.

EMBODIMENTS

FIG. 1 illustrates one embodiment of a wireless communications network configured to implement embodiments of the invention. As illustrated in FIG. 1, a wireless network 10 is formed by transmitting signals between a base transceiver station (BTS) 12 and user equipment network devices (UEs) 14. The BTS 12 may include various equipment, such as an antenna 16 on a tower 18, and a network device 20 configured to perform functions associated with passing information between the wireless network 10 and other telecommunications networks 22 (such as the Internet). The BTS 12 may be linked with the telecommunications networks 22 via an optical, electrical, wireless, or other link 24. The antenna 16 may be a directional antenna, such as an antenna array, configured to operate in any conventional manner.

User Equipment network device (UE) 14 may be associated with a fixed location 26, such as a wireless modem connected to a computer in a residence, or may be associated with a mobile unit 28, such as a cellular telephone, PDA, or cellular terminal associated with a wireless, modem in a computer. The invention is not limited to any particular UE, but rather extends to any UE configured to operate in accordance with the embodiments of the invention as set forth herein.

Figure 2:
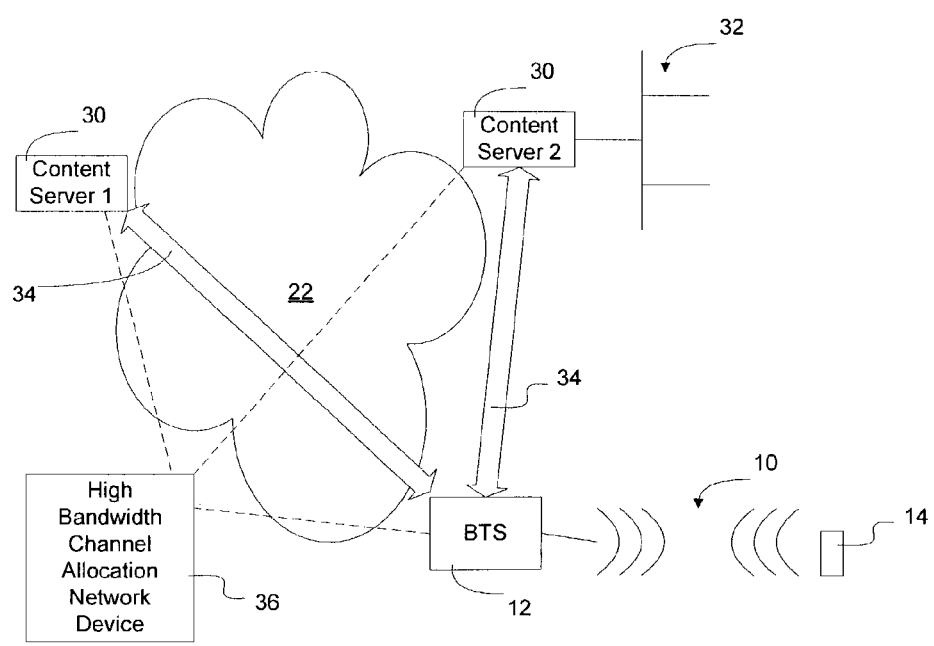
FIG. 2 is a functional block diagram of a wireless communications network according to an embodiment of the invention.

FIG. 2 illustrates a telecommunications network according to an embodiment of the invention including a BTS 12 configured to communicate over a wireless network 10 with one or more UEs 14. As shown in FIG. 2, the telecommunications network 22 may include one or more content servers 30 that may contain resources or have access to resources over other public or private networks 32.

The content servers 30 may be connected to the BTS through ordinary paths through the public network 22, or, optionally, may be connected to the BTS through virtual private network tunnels 34 set up in any conventional manner, such as via encapsulation or encryption. The invention is not limited to any particular manner of establishing a connection between the content servers 30 and the BTS 12.

A High Bandwidth Channel Allocation (HBCA) network device 36, according to embodiments of the invention, is configured to manage end-to-end communication of data to and from the UE, taking into account layers 1 through 7 of the OSI model, to create a constant delay function attendant with requesting and receiving data over the wireless network. This enables data replies to be received by the requesting UE in a reliable and expected manner to facilitate anticipatory pre-caching of data and to enable management of customer expectations. Optionally, as desired, an user requested delay in delivery of the requested resource may also be accommodated to enable the user to pre-schedule data delivery during a desired time interval. In one embodiment, the HBCA 36 is configured to receive resource requests, allocate bandwidth on the high-bandwidth data channel on the wireless network 10, determine direction or location information associated with the requesting UE, and coordinate delivery of data from the content servers 30 to the UE 14 through the BTS. Optionally, the HBCA may perform additional functions attendant to delivery of the data, such as encrypting the data and/or compressing the data prior to transmission.

As discussed in greater detail below, the HBCA 36 may be included in the network device 20 of FIG. 1, may be instantiated as one or more processes running on the BTS 12, may be formed as a separate network device associated with the BTS 12, or may be instantiated as one or more processes running on a network device on the public network 22. In one embodiment, the bandwidth scheduler, resource proxy, and antenna controller components of the HBCA are formed as a separate network device serving multiple BTSs. In other embodiments, the components of the HBCA are formed as one or more processes instantiated on the public network and serving only a single BTS. The invention is not limited to the location of the components of the HBCA in the wireless network 10 or public network 22.

Figure 3:
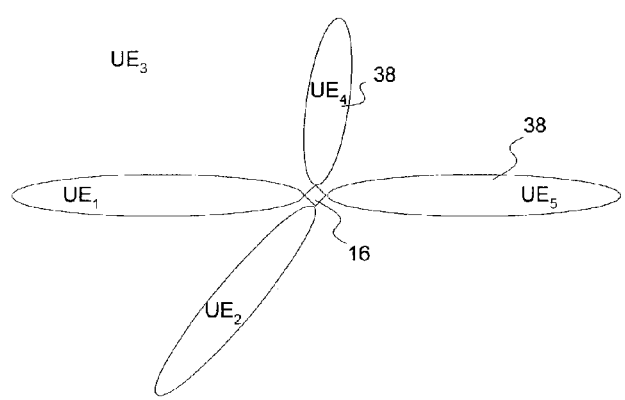
FIG. 3 is a diagram of a directional wireless antenna broadcasting to wireless access points within a cell according to an embodiment of the invention.

FIG. 3 illustrates a directional antenna configured to broadcast in a directional manner. Where a single antenna array configured to broadcast information with a single primary lobe is used, such as the antenna illustrated in FIG. 4, the directional antenna is configured to broadcast data over the high bandwidth data channel by focusing its main lobe in the direction of the UE specified to receive data during the specific time slot. By focusing the primary lobe of the antenna in the direction of a specified recipient for the duration of the required transmission, the BTS can concentrate broadcasting power in the direction of the intended recipient thus increasing signal to noise ratio for that intended recipient while reducing signal to interference ratio for other recipients. In FIG. 3, this may be accomplished using, for example, a smart antenna configured to focus the primary lobe on one of the UEs, and then refocus the primary lobe in the direction of another UE during that second UE's assigned access slot.

Alternatively, in another embodiment, multiple primary lobes may be formed to transmit data over the high bandwidth data channel to multiple UEs simultaneously. Conventional antenna arrays or smart antennas may be capable of directing a beam in one, two, or multiple directions depending on the number of arrays used in the antenna, the number of array elements found in each array, the configuration of the arrays, and the signal processing instantiated in the software controlling the antenna arrays. The invention is not limited to any particular directional antenna technology.

Figure 4:
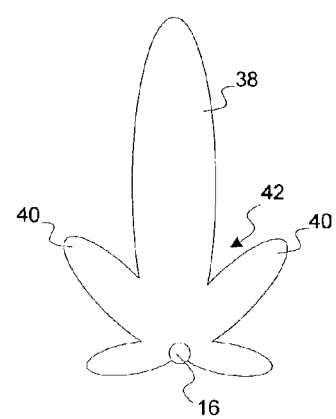
FIG. 4 is an example of a broadcast pattern of a conventional directional antenna.

FIG. 4, illustrates a typical transmission power from an antenna. As shown in FIG. 4, an antenna array configured to transmit a directional beam generally has a primary lobe 38 and several secondary lobes 40. The areas of relatively low transmission power between the lobes 38, 40 are referred to as nulls 42. By adjusting the primary and secondary lobes it is possible to steer one or more nulls (e.g. electronically) to be in the direction of an unintended recipients. This is commonly known as null steering.

According to one embodiment of the invention, geographic and/or directional information is used to assign access slots to the high bandwidth data channel so that users in different sections of the cell served by the BTS are able to receive access to the high bandwidth data channel simultaneously. Utilizing a directional array enables the same spectrum (code, frequency, or time slot) to be used several times within one cell simultaneously without causing undue interference between transmissions. By selecting intended recipients such that the primary lobes of two transmissions do not overlap excessively, it is possible to minimize mutual interference and hence enable spectrum reuse to occur. For example, if each primary lobe is 10° wide, the BTS may select users for simultaneous transmission that are sufficiently far apart, e.g. 15-20°, to enable the UEs to receive a sufficiently strong signal with an acceptably high signal/noise ratio and/or signal/interference ratio. The specific degree of separation will depend on the implementation and characteristics of the particular cell, and the invention is not limited by any particular degree of separation.

Additionally, according to another embodiment of the invention, in addition to steering the primary lobe of the intended antenna toward the intended UE, the directional information is used to steer nulls of other antennas within the cell toward the intended UE. By employing null steering on transmitting antennas that are transmitting information not intended for the particular recipient, it is possible to further minimize interference when spectrum sharing is used to increase the effective bandwidth on the high bandwidth data channel.

In densely populated areas, with relatively closely separated cells, transmissions from one cell may interfere with transmissions and/or reception in adjacent cells. To minimize interference, reception on an adjoining cell may be suspended or retransmission requested when the primary lobe 38 of a broadcast signal encompasses both a broadcasting UE and a receiving BTS in the adjoining cell. An example may help explain this consideration.

Figure 5:
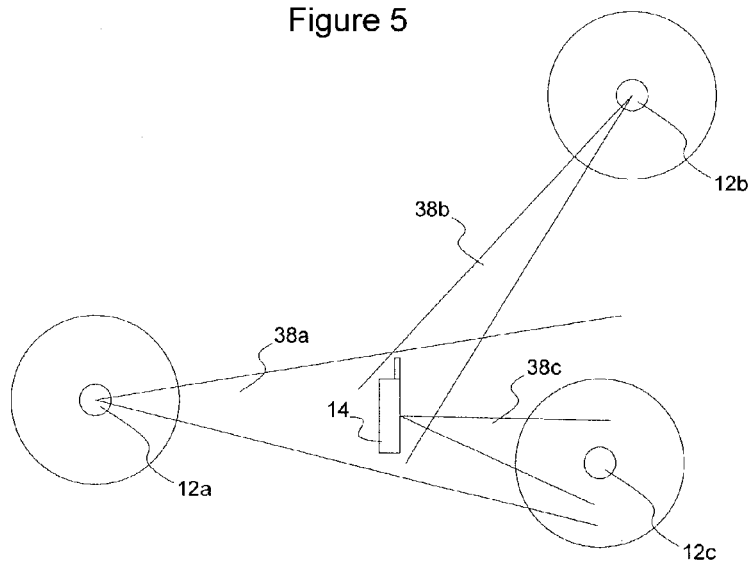
FIG. 5 is a diagram of an example of a network in which three cells are able to reach a particular user according to an embodiment of the invention.

In FIG. 5, a UE 14 is situated in a relatively densely populated cell coverage area of a wireless network. In FIG. 5, assume that BTS 12*a* is attempting to broadcast to a user (either UE 14 or another user in the same general direction) and that the primary lobe 38*a* encompasses UE 14. Assume also that UE 14 is attempting to broadcast data to BTS 12*c* during the same access slot or in an access slot that at least partially overlaps with the access slot in use from BTS 12*a*. In this situation, there is likely to be quite a high degree of interference between the transmission from UE 14 to BTS 12*c* and the transmission carried on primary lobe 38*a*. Accordingly, in this situation, where the primary lobe 38*a* encompasses both the transmitting UE 14 and the receiving BTS 12*c*, the BTS 12*c* may determine that the interference ratio on the received signal is too high and may suspend reception during the access slot or request retransmission (e.g. over the control channel) after the transmitting primary lobe 38*a* has completed transmitting data during that particular access slot. Non-receipt of data during a scheduled access slot may be indicative to the BTS that the UE 14 encountered a problem such as a transmission collision or that the UE 14 decided not to transmit data on the allocated access slot. Non-receipt thus may cause a protocol exchange to take place over the control channel to either reschedule the attempted transmission or cancel the transmission.

In this example, transmissions from BTS 12*b* would not have the same effect on transmissions between UE 14 and BTS 12*c* since the primary lobe 38*b* does not encompass BTS 12*c*, and hence the radiation from BTS 12*b* may be assumed to not interfere significantly with transmissions between UE 14 and BTS 12*c*.

Minimizing collisions between UEs and BTSs may be accomplished by scheduling BTS transmissions using a centralized controller to implement a Tower Division Multiplexing scheme, via implementation of a self-configuring scheme, or utilizing feedback from the UE. For example, base transceiver stations in adjoining cells may transmit notification messages to adjoining cells or to a central controller indicating access slots when transmissions are likely to be directed at the adjoining BTS. Alternatively, the BTSs may adopt a self configuring scheme where, e.g., a set number of access slots may be reserved for transmission at the BTS of adjoining cells. This second solution has the advantage of not requiring prior notification and also enables auto-synchronization between adjoining cells. Specifically, assume that, for example, time slots 1-4 were reserved for transmission at adjoining BTSs. Each time a BTS sensed an excessive degree of interference from an adjoining cell, it would know that the adjoining cell was transmitting in one of its time slots 1-4. This enables the adjoining base station to synchronize its transmissions with the adjoining cell to allocate its time slots accordingly and to not schedule transmission to or reception from UEs in the direction of the neighboring BTS during the next cycle. For a CDMA system, particular codes could be used to transmit toward other BTSs. For recurring transmissions, the UE may also request an alternative access slot where, for example where it is perceiving increased interference during the assigned access slot.

Specifically, assume that BTS 12*a* has assigned time slots 1-4 for broadcasting data to UE 14*s* within a 10 degree area encompassing adjoining BTS 12*c*. When BTS 12*c* senses, on its antenna, excessive interference originating from BTS 12*a*, it knows that it should not assign those four consecutive time slots to reception of information over the data channel from UEs that are located in the direction of BTS 12*a*. Thus, in the next cycle, BTS 12*c* can assign different time slots to UE 14 in the direction of BTS 12*a*, and can use the time slots for transmission of information to other UEs not in the direction of BTS 12*a*.

Similar concerns abound regarding transmissions from BTS 12*c* to UE 14. If BTS 12*a* is transmitting data to user equipment over primary lobe 38*a* at the same time BTS 12*c* is transmitting data to UE 14, intended recipients may experience an unacceptable high degree of interference, effectively reducing the throughput on the data channel. To avoid this, the BTSs should attempt to schedule transmissions so that both BTSs are not transmitting directly at each other in any given time slot. This may be done through notification messages or through sensing increased levels of interference and adjusting broadcast patters accordingly, as described above.

FIGS. 6-9 illustrate several possible ways to implement the bandwidth scheduler, resource proxy, and antenna controller components of an HBCA network device according to embodiments of the invention. The invention is not limited to these several illustrated embodiments, but rather extends to all possible permutations.

In the embodiments illustrated in FIGS. 6-9, the HBCA 36 is configured to receive one or more requests for resources and/or bandwidth from an UE 14 over a low-bandwidth control channel, obtain location or direction information associated with the requesting UE 14, obtain the requested resource (if necessary), and coordinate access to bandwidth and/or delivery of the requested resource to the UE 14 over the high-bandwidth data channel. The invention is not limited to this particular divisions of responsibility between the three components of the HBCA illustrated in these several embodiments, however, as one or more of these functions may be combined and processes shared to optimize transmission of the requested resource to the requesting UE 14.

Where data is sought to be transmitted by the UE 14, the HBCA may not need to obtain any resource, but may need to coordinate via established protocols for one or more other network devices to receive the data upon transmission. While the invention will be described herein as illustrating transmission of data from the BTS to the UE, the invention is not limited in this regard as illustrated by the two-ended arrows 68, 70 illustrating the flow of data as proceeding in both directions between the UE and HBCA. Similarly, although only a single UE has been illustrated for simplicity, in an operational setting more than one UE may be requesting access to data and, as described above, the same data may be accessed by more than one UE at the same time. Thus, the invention is not limited to a single UE obtaining access to the broadcast data, or to the HBCA broadcasting a single high bandwidth data channel at any one particular time.

FIG. 6 illustrates an embodiment of the invention in which the high bandwidth channel allocation network device (HBCA) includes a bandwidth scheduler component, resource proxy component, and antenna controller component, all instantiated in the same network device as either a single process or as an integrated set of processes. As shown in FIG. 6, upon ascertaining a need for a resource, the UE 14 transmits a resource request 50 over a control channel as discussed in greater detail above. Where the UE 14 has an enabled GPS receiver or otherwise knows its location, it may transmit that information as well, either in the resource request 50 or in a separate location message 52. Upon receipt of the resource request 50 and/or location message 52, the antenna 16 passes the resource request 54 to the HBCA 36 either directly or after performing standard signal processing associated with the antenna, such as performing noise suppression, cross-correlation between antenna elements, or any other signal processing that may be advantageously performed by the antenna 16 and associated circuitry.

Upon receipt of a resource request message 50, the antenna 16 ascertains the direction from which the resource request message 50 originated, and checks for an associated location message 52 from the same UE 14. The direction information gleaned from receipt of the resource request message 50, the location message 52, and any other relevant parameters such as the perceived signal strength, are placed in a location information message 56 and passed to the HBCA 36. Many techniques may be used to ascertain the direction of transmission of the requesting UE 14, as discussed in greater detail above. Additionally, triangulation techniques, such as may be accomplished by the cell phone by sensing the relative signals of adjoining cells, or by the network by sensing the relative strength of a transmitted signal and direction of a signal between adjacent cells may be used as well. The invention is not limited to any particular manner of obtaining direction information or location information from the UE 14 or antenna 16.

Upon receiving a resource request 54, the HBCA 36 will ascertain whether there is sufficient bandwidth to accommodate the requested transmission. If there is insufficient bandwidth on the high speed data channel, the HBCA 36 transmits a request denied signal over the low bandwidth control channel to the UE 14. If there is sufficient bandwidth available on the high bandwidth data channel, the HBCA 36 transmits a data request 58 for the resource over the public network to an appropriate content server 30 using established protocols and known methods. Optionally, the HBCA 36 may acknowledge receipt of the request over the low-bandwidth control channel as well.

Upon receipt of the resource 60 from the content server 30, the HBCA 36 allocates bandwidth on the high bandwidth data channel and communicates the bandwidth allocation 62 to the UE 14 over the low bandwidth control channel. The allocation may take into account the type of information requested, the duration of the requested transmission, and the geographic position or direction of the requesting UE 14. The bandwidth allocation (B/w reply 62) may take many forms, depending on the type of resource requested. For example, where the requested resource is a time-sensitive long duration data application, such as a video telephony application, the B/w reply 62 may include information indicative of a recurring access code or recurring access slot. Where the requested resource is a burst of data to be downloaded, the B/w reply 62 may include information indicative of one or more allocated access slots. Optionally, the B/w reply may include synchronization information to enable the UE 14 and antenna 16 to be synchronized just prior to transmission of the data over the high speed data channel.

In connection with sending the B/w reply 62, the HBCA transmits a direction information message 64 to the antenna 16 indicating to the antenna the direction in which it is to transmit a particular access slot. Access slots are discussed in greater detail below in connection with FIG. 10. The direction information message 64 may be distinct from B/w reply 62, may be included in B/w reply 62 and interpreted by the antenna 16, may be sent in connection with the data (discussed below) or may be sent in a group format, e.g., direction information for access slots in the upcoming cycle may be transmitted together at the beginning of the cycle, periodically during the cycle, or as they are allocated.

The antenna transmits the bandwidth allocation via a bandwidth reply 66 to the UE 14 over the low bandwidth control channel. The bandwidth reply 66 contains access information instructive of when and how to access information on the data channel. Once the UE 14 has acknowledged receipt of the bandwidth reply 66 (acknowledgment is optional), the HBCA 36 transmits the data 68 to the antenna for transmission 70 to the UE 14 over the allocated access slots on the high speed data channel. Optionally, the UE 14 and HBCA 36 may communicate additional status, failure, completion, or other messages over the control channel prior, during, or after transmission of the requested data over the high speed data channel.

FIG. 7 illustrates an embodiment in which the UE 14 transmits a request for a resource over the control channel, and in which the resource proxy 72 and bandwidth scheduler 74 components of the HBCA 36 are instantiated as different processes on the same device or on different devices. The antenna controller component, in the embodiment illustrated in FIG. 7, is instantiated as a process along with the resource proxy component 72.

As shown in FIG. 7, upon ascertaining a need for access to a resource, the UE 14 transmits a resource request 50 via a low-bandwidth control channel to the HBCA 36. The antenna 16 receives the request, ascertains direction information associated with the resource request 50, and determines if there is associated location information contained within the resource request 50 or that has been transmitted separately in a location information message 52. The antenna 16 then transmits the resource request 54 and location information message 56 to the resource proxy and antenna controller components 72. The location information message 56, in this embodiment, will be used by the antenna control component to ascertain the direction and relative power of the outgoing signal for use with transmission of the requested resource over the high bandwidth data channel.

The resource proxy, upon receiving a request for a resource, formats and transmits a data request 58 over the public network and waits for a response containing the data 60. Optionally, the resource proxy may also exchange information with the bandwidth scheduler to inform the bandwidth scheduler that the resource proxy is likely to request data soon, and to ascertain whether there is likely to be bandwidth available on the high speed data channel. The resource proxy may also communicate with the UE 14 over the control channel to advise the UE 14 as to the status of the request.

Upon receipt of the requested data 60, the resource proxy component requests bandwidth from the bandwidth scheduler 74 by passing a data ready message 76 indicating the size of the data to be transmitted and any other pertinent information, such as the priority of the data and the likely duration of the data stream if the data is not a single burst. The bandwidth scheduler 74 allocates bandwidth on the high speed data channel, and transmits the bandwidth allocation to the UE 14 via bandwidth reply messages 62, 66. The bandwidth scheduler also transmits the bandwidth allocation to the resource proxy and antenna controller 72 via a transmission reply message 78 indicating to the resource proxy and antenna controller when to transmit the resource to the requesting UE. Optionally, the bandwidth reply message 62 may be generated by the resource proxy instead of the bandwidth scheduler 74 to allow the UE 14 to have a single point of contact for the resource on the network.

Upon receipt of the transmission reply message 78, the antenna controller component passes the direction information 64 to the antenna 16 to enable the antenna to direct the high bandwidth data channel toward the requesting UE 14, and passes the data 68 to be transmitted to the antenna 16 for transmission 70 over the high bandwidth data channel to the requesting UE 14. The direction information may be separately transmitted to the antenna or may be included in one of the other messages, such as in connection with the data, e.g. the direction information may be included as a discernable portion of the data, such as in a header of the data packets.

Figure 8:
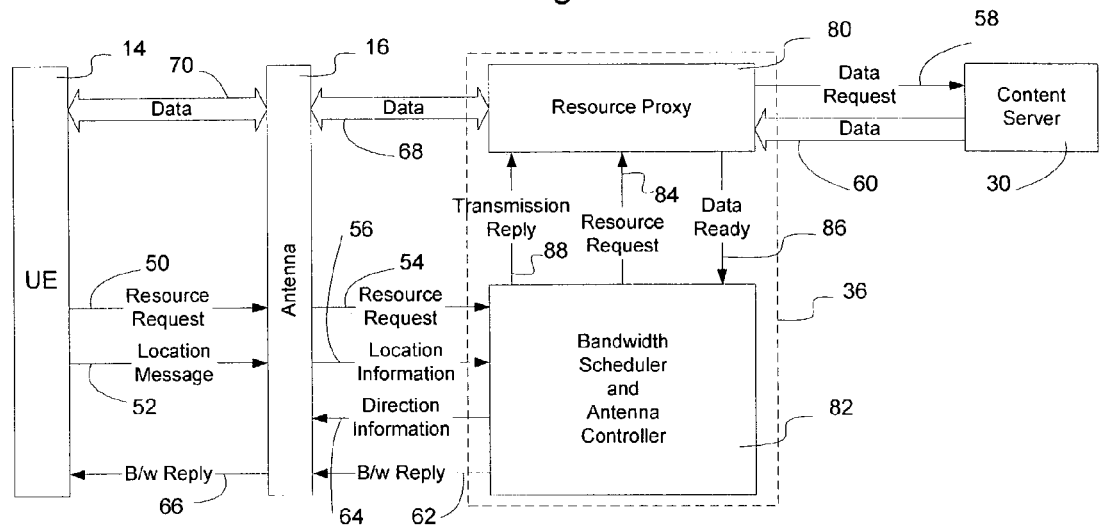

FIG. 8 illustrates another embodiment in which the UE 14 transmits a request for a resource over the control channel, and in which the resource proxy component 80 and bandwidth scheduler component 82 of the HBCA 36 are instantiated as different processes on the same device or on different devices. In this embodiment, the antenna controller component is integrated with the bandwidth scheduler component 82, and communication with the UE 14 over the low-bandwidth control channel is handled by the bandwidth scheduler 60.

As shown in FIG. 8, upon receipt of a resource request 50, antenna 16 checks for an associated location information message 52 and determines the direction information associated with the transmitting UE 14. The antenna 16 then passes the resource request 54 and the location information message 56 to the bandwidth scheduler and antenna controller 82.

The bandwidth scheduler passes the resource request to the resource proxy 80 via a resource request message 84. The resource proxy requests the data 58 from the content server 30 and receives the data 60 as described above. Upon receipt of the requested resource, the resource proxy notifies the bandwidth scheduler 82 that the resource is available for transmission via a data ready message 86. The bandwidth scheduler allocates bandwidth on the data channel and notifies the resource proxy 80 of the allocation via a transmission reply message 88, and notifies the UE 14 of the allocation via bandwidth reply messages 62, 66. The antenna controller notifies the antenna of the direction, and optionally power, associated with the designated access slot via a direction information message 64, and, in the designated access slot(s) the resource proxy 80 transmits 68, 70 the requested resource to the UE 14.

Figure 9:
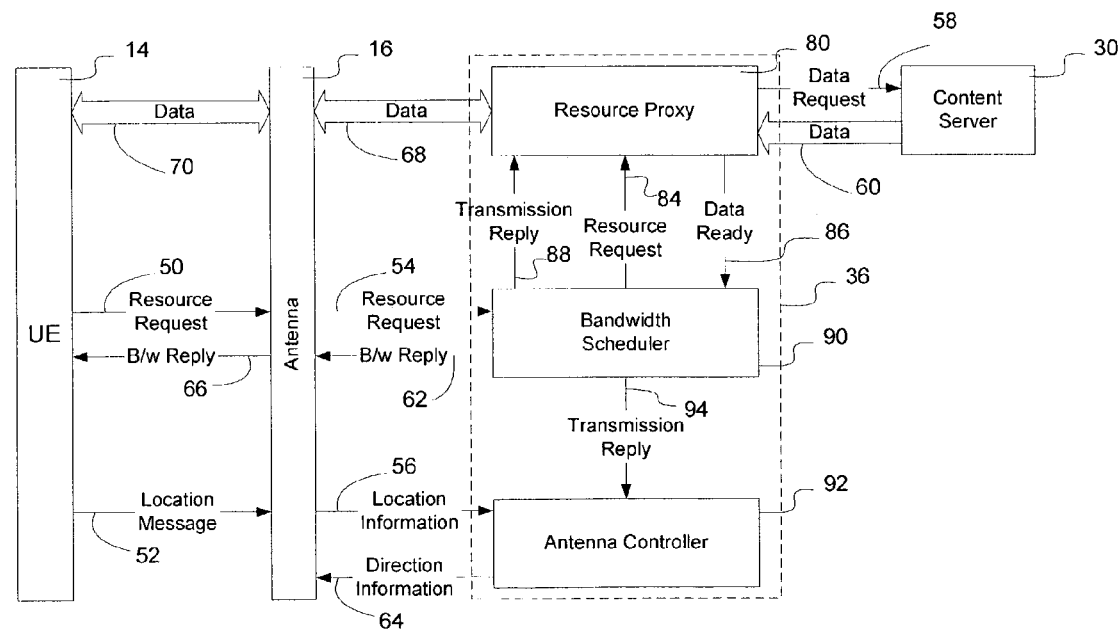

FIG. 9 illustrates another embodiment of the invention in which the resource proxy component, the bandwidth scheduler component, and the antenna controller component of the HBCA 36 are instantiated as different processes on the same device or on different devices. In this embodiment, the antenna controller 92 may be associated with the antenna and physically located adjacent the antenna, or may be co-located with the resource proxy 80 and bandwidth scheduler 90. In the embodiment shown in FIG. 9, communication with the UE 14 over the low-bandwidth control channel is handled by the bandwidth scheduler 60. Information associated with the location or direction of the requesting UE 14 is handled by the antenna controller 92. Tasks associated with obtaining, queuing, and transmitting resources over the high bandwidth data channel are allocated, to the resource proxy 80.

As shown in FIG. 9, in this embodiment, when a UE 14 desires access to a resource, it transmits a resource request message 50 that is received by antenna 16 of HBCA 36. The antenna 16 determines the direction from which the signal arrived, the relative power, and whether a location message 52 accompanied the resource request. The resource request 54 is passed to the bandwidth scheduler 90 and the location information message 56 is passed to the antenna controller 92 along with identifying information to enable the antenna controller to correlate subsequent bandwidth allocations with a particular UE 14. For example, the location information may be identified by the UEs electronic serial number identification number, mobile identification number, information contained in a subscriber information module associated with the UE, the MAC address of the UE, the Portable ID number associated with the UE, or any other number or code that may be used to identify the UE 14.

The bandwidth scheduler 90, upon receipt of the resource request 54, passes a resource request 84 to the resource proxy 80. The resource proxy 80 sends a data request 58 to the content server 30, which returns data 60. Resource proxy 80 queues the requested resource and returns a data ready message 86 to the bandwidth scheduler 90. The bandwidth scheduler 90 obtains one or more access slots for transmission of the resource over the high bandwidth data channel. The bandwidth scheduler sends a bandwidth reply 62, 66 to the requesting UE 14 over the control channel, and sends a transmission reply 88 to the resource proxy identifying the resource and indicating the allocated access slot(s) for transmission. The bandwidth scheduler 90 also sends a transmission reply message 94 to the antenna controller 92 indicating the identity of the requesting UE 14 and the time slot(s) during which the resource will be transmitted to the requesting UE 14. Upon receipt of the transmission reply message 94 from the bandwidth scheduler, the antenna controller 92 directs the antenna 16 to point the primary lobe of the antenna transmission beam 38 in the direction of the requesting UE 14 during the allocated access slot, and the resource proxy 80 causes the requested resource to be transmitted over the high bandwidth data channel 68, 70 to the requesting UE 14 during the allocated time slot.

Figure 10:
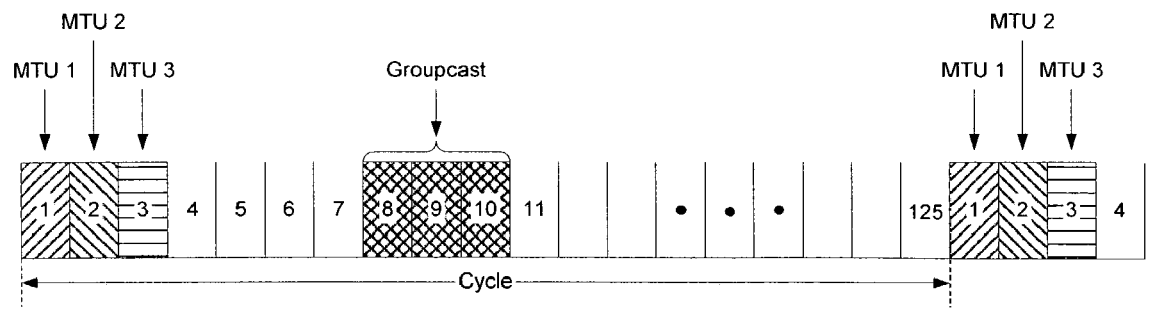
FIG. 10 is a timeline illustrating one possible channel allocation on a high bandwidth transmission channel according to an embodiment of the invention.

FIG. 10 illustrates one example of several possible ways of allocating access slots on the high bandwidth data channel. The access slots in FIG. 10 may be time slots, code slots, frequency allocations, or any other division of bandwidth on the network. For ease of illustration, FIG. 10 illustrates the access slots as time slots in a cyclical physical layer protocol. The invention is not limited to the particular illustrated allocation or protocol.

As illustrated in FIG. 10, the access slots in the data channel may be allocated in any number of different manners. For example, as shown in FIG. 10, some of the access slots (e.g. slots 1-3) may be allocated to UEs requiring recurring access to the high speed data channel, for example to participate in video telephony or for other regularly recurring bandwidth intensive applications. Other access slots (e.g. slots 8-10) may be used to transmit multicast information, the access codes to which have been previously distributed via the control channel to UEs wishing to participate in the multicast session. Other access slots (e.g. slots 4-7 and 11-125) may be allocated to UEs on an as-needed basis to accommodate data bursts to the specified UEs. Optionally, the access slots may be allocated to UEs based on the UE's geographic relationship with the BTS to reduce the amount the transmitted beam must be moved between time slots, to minimize interference between adjacent cells, to maximize the number of beams that may be broadcast in the came cell simultaneously (frequency reuse) or to optimize any other desired condition. The invention is not limited to transmission of these three particular types of traffic over the high bandwidth data channel, but rather extends to all potential uses of the high bandwidth data channel.

Figure 11:
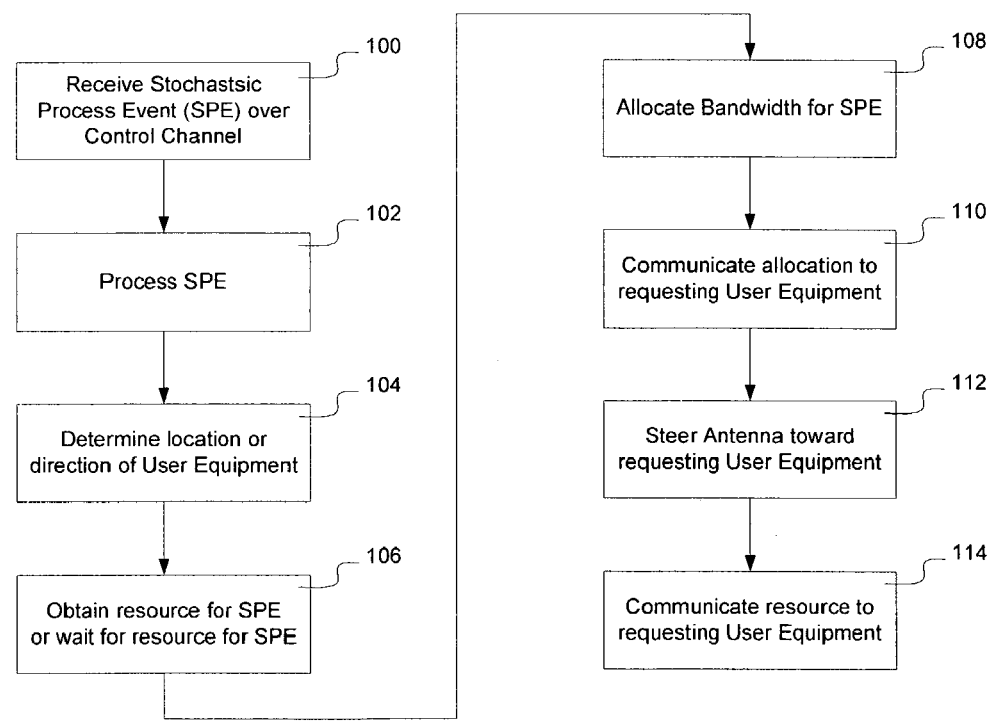
FIG. 11 is a flow chart of an example of software that may be used to implement embodiments of the invention.

FIG. 11 illustrates a flow chart of software that may be used to implement embodiments of the invention. In the embodiment illustrated in FIG. 11, stochastic process events are handled over the control channel to allow bandwidth on the data channel to be allocated efficiently. As shown in FIG. 11, upon receipt of a stochastic process event 100, such as a request for a resource, the network device will process the stochastic process event 102 and determine the direction and/or location of the requesting UE 14 104. The software will also obtain the resource or wait for the resource to arrive for transmission over the high speed data channel 106.

Concurrent or subsequent with obtaining access to the requested resource, the network device will allocate bandwidth on the high bandwidth data channel 108 to accommodate the requested resource. The network device will also communicate the allocation 110 to the requesting UE, steer the antenna toward the requesting UE 112 and, in the allocated access slots, communicate the requested resource to the requesting UE 114.

EXAMPLES

A series of examples may help to explain the operation of the invention. The following examples are not meant to limit the invention but rather to explain the principles of operation in potential real-life situations. Accordingly, the invention is not limited to any particular set of circumstances in the following examples.

Example 1—downloading file

Assume, in this example, that an user wishes to download a resource from the Internet, such as a file stored on a server on the Internet. The user, in this example, sends a request via the control channel to the HBCA requesting the file. The HBCA determines the location and/or direction of the requesting user, obtains the file, determines the size of the file, the transmission priority, and class of service. The HBCA then allocates access slots on the data channel to place the file in line for transmission to the requesting user.

The HBCA advises the user, on the control channel, of the amount of delay before the download will commence, the download duration, and other pertinent information, such as the cost of the download, and optionally may provide the user with the ability to confirm or cancel the download. The HBCA then provides direction information to the antenna and causes the download to commence in the direction of the requesting user in the allocated access slots. Once the download has commenced, the HBCA confirms the commencement with the requesting network device via the control channel. The control channel is then used to acknowledge receipt of the file by the requesting network device or to request retransmission in the event of a failure.

Example 2—Video Telephony

Assume, in this example, that a wireless user wishes to initiate a video telephone call (either one way or bi-directional). In this instance, using embodiments of the present invention, the user communicates its request to the HBCA via the control channel. The HBCA determines the direction information associated with the requesting user and checks the availability of the data channel. If the data channel is not available, it will notify the requesting network device via the control channel that it is not possible to make a video telephone call at this time. If the data channel is available, the HBCA will allocate sufficient access slots indefinitely on a one-out-of-every-n basis and will communicate to the requesting user information sufficient to enable the video call to be set up via the control channel. The HBCA will then associate the direction information with the access slots to enable the antenna to direct the high speed data channel toward the intended recipient during the allocated access slots.

Example 3—Groupcast

Assume, in this example, that the user would like to receive groupcast information made available to a group of users through the wireless network. The groupcast information may be any commonly available groupcast information, such as streaming video, streaming audio, sports scores, news items, stock quotes, or other text-based information, or other types of media suitable to be broadcast to a group of recipients.

In this example, the requesting network device will send a request to join or initiate a groupcast session to the HBCA via the control channel. The HBCA will check to see if there is a groupcast session matching the request already in place on the data channel. If the groupcast session exists, the HBCA will respond to the requesting network device via the control channel with sufficient information to enable the requesting network device to join the groupcast session. If the groupcast session is not being broadcast or queued to be broadcast on the data channel when the scheduler receives the request to join the groupcast session, the HBCA will check to see whether there is sufficient bandwidth on the data channel to accommodate the request. If there is, the HBCA will allocate access slots to the groupcast session and will respond to the requesting network device with sufficient information to enable the requesting network device to receive the requested groupcast information. If, however, there is insufficient bandwidth to accommodate the request, the denial of service will be communicated back to the requesting network device via the control channel. Groupcast information may be broadcast omnidirectionally, may be distributed via a directional beam with a relatively large primary lobe 38 to enable the lobe to encompass the intended recipients, or may be distributed via multiple narrow beams directed toward intended recipients.

Information associated with an affirmative response to the request to join a groupcast session may include when the groupcast session will commence, the duration of the groupcast session (if the groupcast session is of a predetermined duration), the access slots during which the groupcast session will be broadcast, access code(s) and/or decryption code(s) to enable the network device to have access to and, optionally, to decrypt the groupcast information, and any other pertinent information.

Figure 12:
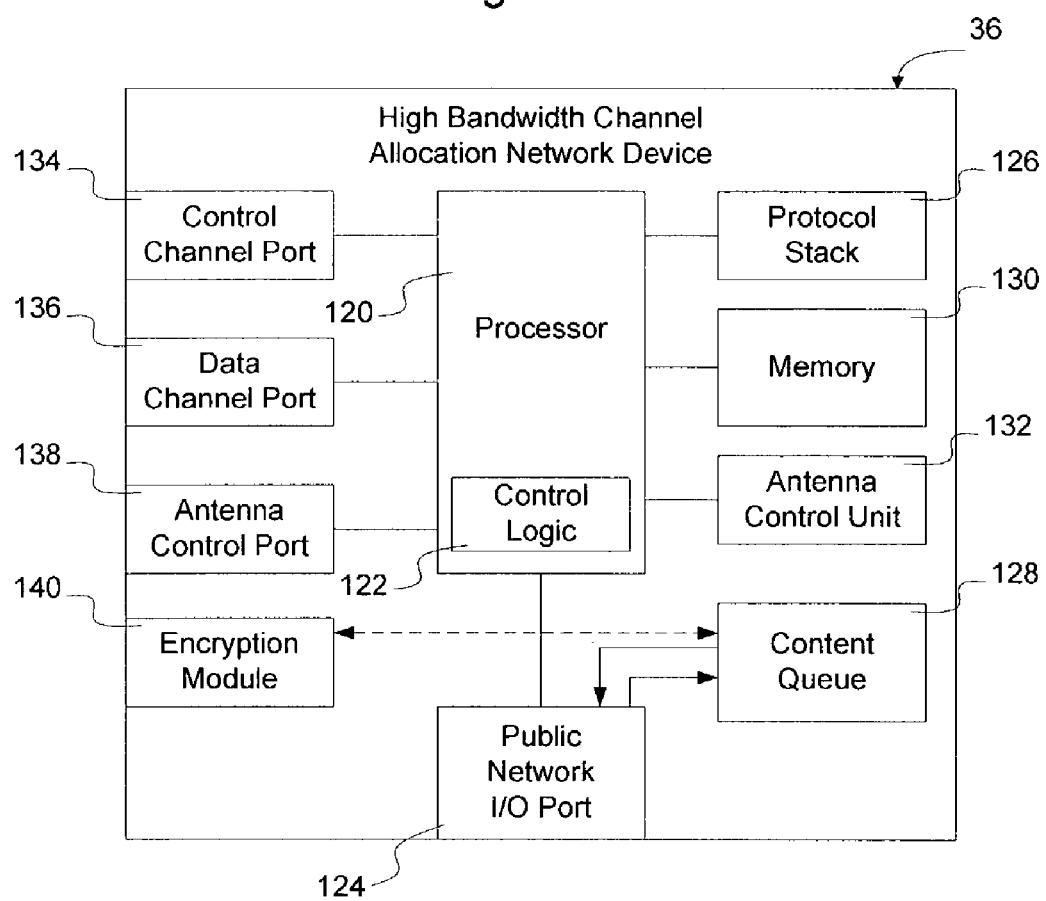
FIG. 12 is a functional block diagram of an example of a high bandwidth channel allocation network device according to an embodiment of the invention.

FIG. 12 illustrates one embodiment of a High Bandwidth Channel Allocation Network Device 36 according to an embodiment of the invention. As illustrated in FIG. 12, the HBCA 36 contains a processor 120 having control logic 122 configured to implement the functions ascribed to it as described above in connection with FIGS. 1-11. The HBCA also includes public network I/O ports 124 configured to enable it to communicate data received over the data channel and requests for resources received over the control channel onto the public network 22, and receive information from the public network. Interactions with wireless network 10 and the public network 22 may be facilitated through the implementation of a protocol stack 126 containing instructions and data relevant to communications protocols commonly used on those networks.

A content queue 128 is provided to temporarily store resources returned in response to requests 58 passed onto the public network. Optionally, the content queue may retain resources in the queue 128 until overwritten by other requests to enable the network device to more quickly respond to commonly recurring requests. A memory 130, formed separate from the content queue 128 or forming a part of content queue 128, contains data and/or instructions for use by the control logic to enable it to perform the functions required of it to participate in communicating over the control channel and data channel.

An antenna control unit 132 is provided to enable the HBCA to process information received from the antenna 16 to derive direction and/or location information about user equipment. The antenna control unit may be a separate processor unit configured to interpret GPS information, antenna signal information, and other information, and to enable it to control the antenna array to form an appropriate beam. The antenna control unit 132 may provide signals to the antenna indicating the direction in which the antenna should broadcast information and allow signal processing circuitry associated with the antenna to formulate the appropriate antenna patterns required to cause an appropriate beam to be formed. Alternatively, the antenna control unit 132 may format the signals for each of the individual antennas in the antenna array so that minimal processing occurs at the antenna. The invention is not limited to the particular location of the antenna controller or specific details attendant to operation of the antenna controller.

One or more I/O ports 134, 136, 138, are provided to enable the HBCA 36 to send and receive signals to/from the wireless network. Specifically, in the illustrated embodiment, the bandwidth scheduler and resource proxy 36 includes a control channel port 134 configured to receive and transmit information over the control channel, a data channel port 136 configured to receive and transmit information over the data channel, and an antenna control port 138 configured to receive and transmit directional information from/to the antenna. In the illustrated embodiment only three I/O ports have been illustrated to prevent obfuscation of the inventive aspects of the invention. The invention is not limited to a network device having the illustrated number of I/O ports, as a network device may have any number of I/O ports. An encryption module 140 may be provided to facilitate and accelerate encryption/decryption of resources over the data channel.

Figure 13:
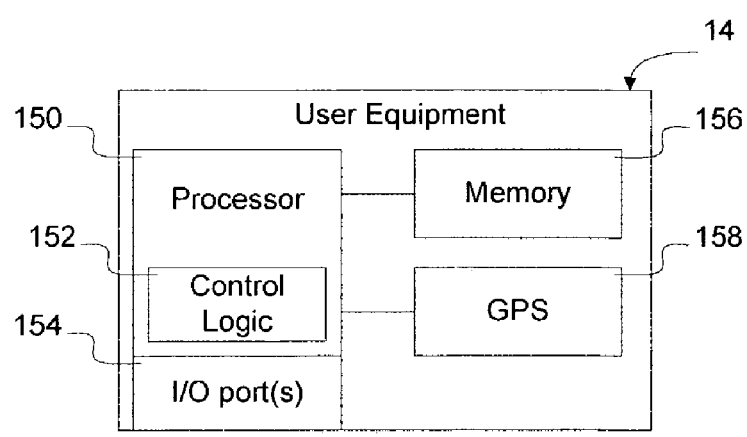
FIG. 13 is a functional block diagram of an example of a user equipment network device according to an embodiment of the invention.

FIG. 13 illustrates one embodiment of a user equipment network device (UE) configured to implement embodiments of the invention. The UE of FIG. 13 may be configured as a conventional GPRS/CDMA2000/UMTS phone, a phone link associated with a laptop carrying a PCMCIA modem, a PDA, or any other wireless data processing unit.

As illustrated in FIG. 13, an UE 14 contains a processor 150 having control logic 152 configured to implement the functions ascribed to it as described above in connection with FIGS. 1-11. The UE also includes I/O ports 154 configured to enable it to communicate via the control channel and the data channel. A memory is provided, in this embodiment, containing instructions and data relevant to communications protocols and containing data and/or instructions for use by the control logic to enable it to perform the functions required of it to participate in communicating over the control channel and data channel. A GPS unit 158 enables the UE 14 to ascertain its present coordinates from the Global Positioning System satellites, and pass that information to the HBCA 36 in connection with obtaining access to the high bandwidth data channel. Use of a GPS module is optional, and the invention is not limited to an UE having a GPS module.

In one embodiment, the UE is configured such that the high bandwidth receiver is only activated for access slots intended for that user to conserve power and extend the battery life of the UE, although the invention is not limited in this regard. Determining when to turn on the receiver to access the data channel may be performed in coordination with synchronization information received over the data or control channel, or in connection with estimated time delays associated with requesting and obtaining information over the data channel.

The control logic 122, 152 of FIGS. 12 and 13 may be implemented as a set of program instructions that are stored in a computer readable memory within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Figure 14:
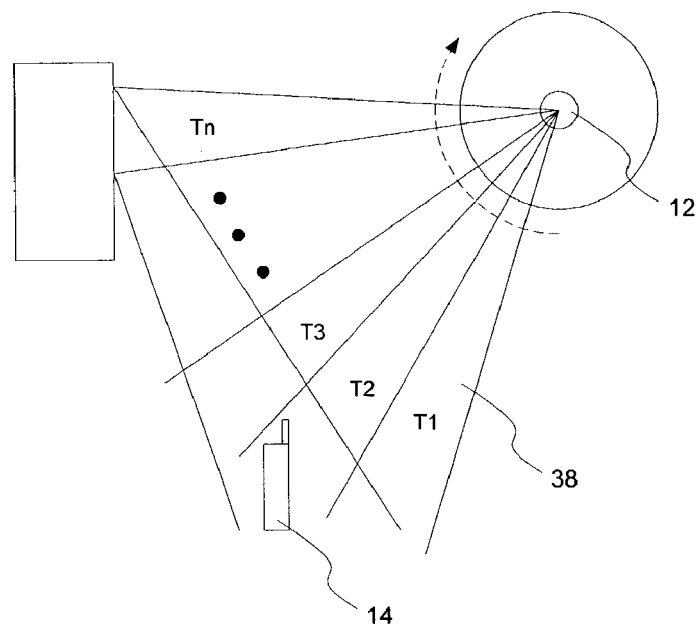
FIGS. 14 and 15 are functional block diagrams of wireless communications networks according to embodiments of the invention.

FIG. 14 illustrates a functional block diagram of a network according to an embodiment of the invention in which the UE 14 is configured to provide feedback to the BTS 12 to assist the BTS 12 with selection of a preferred direction of transmission. Specifically, in FIG. 14, the UE 14 listens to the high bandwidth data channel and tells the BTS 12 which communications it is able to hear clearly. Since the BTS knows in which direction the previous communications was transmitted, it can use this information to select an appropriate transmission direction for the requesting UE 14.

Several methods may be used to obtain feedback from the UE 14. In one embodiment, upon receipt of a request for a resource from a UE 14, the BTS will cause the directional antenna to transmit pulses or test data in multiple directions serially. According to this method, the UE 14 listens to the test data transmitted by the BTS 12 to identify which portion of test data appears to the UE 14 to have the best transmission characteristics. This information is then passed back to the BTS 12 over the control channel to enable the BTS to know where to direct the requested resource.

For example, as shown in FIG. 14, upon receipt of a request for access to the high bandwidth channel, the BTS 12 sweeps a transmission of test data across the spatial range of transmission. In the illustrated embodiment this test data is broadcast serially in areas T1, T2, T3, . . . Tn. The UE 14 listens to the test data and identifies the portion of the test data that was received with the best reception characteristics. Reception characteristics may include signal strength, signal/noise ratio, signal/interference ratio, or any other metric associated with reception. In the illustrated embodiment, the test data broadcast in area T2 may be the strongest, or, alternatively, the test data broadcast in area Tn (reflected off an obstacle) may be the strongest. In either instance, the UE 14 transmits the selected portion of the test data (or some other information related thereto) back to the BTS. An identifying element of information associated with the test data, such as the time of transmission or an identifiable code in the test data, is then used by the BTS to ascertain where the UE 14 is located.

Other methods for obtaining feedback from the UE 14 may be used as well. For example, in one embodiment the UE 14 may listen to the data channel for a period of time prior to making a request to identify access slots that appeared to contain signals with relatively better reception characteristics. This information may be included in a request message or in a location message from the UE 14 to the BTS 12. In this embodiment, the UE 14 in addition to the request, is able to tell the BTS 12 to send the requested resource in the same direction as it sent a previous identified transmission. Identification of an access slot may be accomplished in any manner, such as by sending unencrypted header information or access slot information at the start of each access slot.

Figure 15:
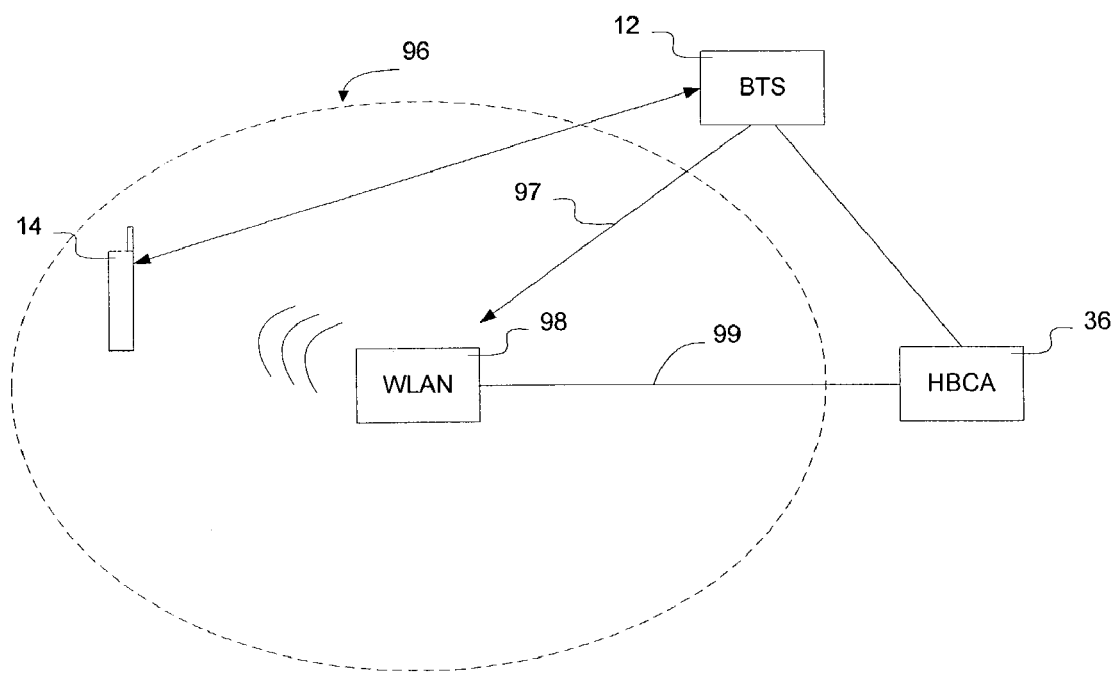

FIG. 15 illustrates a functional block diagram of an embodiment of the invention in which the control channel is used to associate with a link provided by a Wireless Local Area Network (WLAN). There are many WLAN technologies available, for example the 802.11 series, Bluetooth, infrared. The following discussion will use a network device configured to communicate utilizing an 802.11 transmission standard, although the invention is not limited to this embodiment but rather extends to any convenient WLAN protocol. By forming an association between the control channel and 802.11 transmissions, the control channel is able to control, and hence enable access and manage billing information, for the 802.11 network.

As shown in FIG. 15, an UE 14 may request data over the high bandwidth data channel when it is in a WLAN coverage area 96 serviced by a WLAN network device 98, such as an 802.11 transmitter/receiver. There are many ways to ascertain when an UE is in an WLAN coverage area 96. For example, the UE 14 may determine that it is within an WLAN coverage area and transmit that information to the BTS 12 over the control channel. Alternatively, the BTS may be provided with a map or other indication of the location and coverage areas of local WLAN network devices 98 within the cell, and may correlate the UE location information with the WLAN location information to deduce that the UE 14 is within a WLAN coverage area 96. Other methods may also be used to ascertain residence of an UE 14 in a WLAN coverage area 96, and the invention is not limited to any particular method.

In operation, upon receipt of a request for resources over the control channel, the HBCA 36 will request the resource and cause the resource to be passed to the WLAN network device for transmission to the requesting UE 14. The resource may be received by the HBCA 36 and forwarded to the BTS for directional broadcast 97 to the WLAN network device 98 or may be transmitted or caused to be transmitted over a wireline network 99 to the WLAN network device 98.

Upon receipt of the resource intended for the UE 14, the WLAN network device 98 will establish a communication session with the UE 14, if necessary, and transmit the requested resource to the UE 14. Accounting, authorization, and authentication of the UE on the WLAN may all be handled by the wireless network to simplify implementation and deployment of the WLAN network. The invention described herein has been described in connection with a UE requesting bandwidth over the control channel to enable transmissions between the UE and BTS to occur. The invention is not limited in this regard, as the UE may also place requests for bandwidth on the high bandwidth data channel for transmissions to take place with another UE. For example, one UE may desire another UE to have access to a resource or may desire to transmit a resource to another resource. According to an embodiment of the invention, the control channel may be used to request access on behalf of another UE to enable that other UE to receive or transmit over the data channel. Direction and/or location information of the other UE may be obtained by the network in any number of ways, such as by pinging the second UE on the control channel, via SMS-like messages, or any other convenient location ascertainment method. The invention accordingly, extends to use of the control channel to schedule bandwidth on the data channel with other intended recipients as well as with the requesting UE.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of facilitating transmission of data over a wireless network, the method comprising the steps of:
   receiving a resource request for a resource from a content server from a first user equipment network device via a first, low bandwidth, channel;
   ascertaining direction information associated with the first user equipment network device;
   determining whether there is sufficient bandwidth on a second, high bandwidth channel, to accommodate the resource request;
   receiving the resource from the content server;
   allocating bandwidth on a second channel after receipt of the resource; and
   directionally transmitting the resource over said second channel toward said first user equipment network device.

2. The method of claim 1, wherein the resource request is a request to download data to the first user equipment network device, and wherein the step of allocating bandwidth comprises allocating access slots on the second channel.

3. The method of claim 1, wherein the step of ascertaining direction information comprises receiving a message containing Global Positioning System coordinate information.

4. The method of claim 1, wherein the step of ascertaining direction information comprises sensing, by an antenna array, a direction associated with the received resource request.

5. The method of claim 1, wherein the step of ascertaining direction information comprises selecting, by the first user equipment network device, a transmission direction and conveying the selected transmission direction over the first channel.

6. The method of claim 1, wherein the step of directionally transmitting toward said first user equipment network device comprises forming a first primary lobe utilizing a first antenna array, and pointing the first primary lobe in the direction of the first user equipment network device.

7. The method of claim 1, further comprising the step of reusing bandwidth on the second channel by also directionally transmitting said second channel in a second direction toward a second user equipment network device utilizing the allocated bandwidth.

8. The method of claim 7, wherein the step of directionally transmitting toward said first user equipment network device comprises forming a first primary lobe utilizing a first antenna array, and pointing the first primary lobe in the direction of the first user equipment network device; and
   wherein the step of also directionally transmitting toward said second user equipment network device comprises forming a second primary lobe utilizing a second antenna array, and pointing the second primary lobe in the direction of the second user equipment network device.

9. The method of claim 8, further comprising steering a first null of the first antenna toward the second user equipment network device, and steering a second null of the second antenna toward the first user equipment network device.

10. The method of claim 1, wherein the first channel is formed using a wireless cellular link and wherein the second channel is formed using a Wireless Local Area Network link.

11. The high bandwidth channel allocation network device of claim 10, wherein the antenna controller is further configured to adjust a power level output by said antenna in connection with at least one of attenuation information and location information associated with the user.

12. The method of claim 1, further comprising the steps of:
   determining location information of the first user equipment network device; and
   adjusting a power level of a transmitter used to directionally transmit the second channel toward the first user equipment network device based on said location information.

13. The method of claim 1, further comprising the step of communicating access information to said first user equipment network device via the first, low bandwidth, channel, said access information comprising timing information and an access code associated with said high bandwidth communication.

14. A high bandwidth channel allocation network device configured to receive a resource request from a user equipment network device on a first channel, said high bandwidth channel allocation network device comprising:

a resource proxy containing control logic configured to request a resource from a content server in response to the resource request and store the resource;

a bandwidth scheduler containing control logic configured to allocate bandwidth on a second channel after receipt of the resource from the content server; and an antenna controller containing control logic configured to ascertain direction information associated with the user equipment network device and steer an antenna to directionally broadcast data over said allocated bandwidth toward said user equipment network device.

15. The high bandwidth channel allocation network device of claim 14, wherein the control logic is further configured to receive the resource, and transmit the resource in the allocated bandwidth on the second channel.

16. The high bandwidth channel allocation network device of claim 15, further comprising a content queue configured to store the received resource prior to transmitting the resource in the allocated bandwidth on the second channel.

17. The high bandwidth channel allocation network device of claim 16, wherein the content queue is configured to store information until overwritten by other data to enable the network device to have rapid access to recently requested resources.

18. The high bandwidth channel allocation network device of claim 14, further comprising a first low-bandwidth input/output port configured to be connected to the first channel, a second high bandwidth input/output port configured to be connected to the second channel, an antenna control port connected to an antenna control channel, and a public network input/output port configured to access a network having access to the content server.

19. A method, comprising:

obtaining content for transmission via a high bandwidth communication to a user equipment network device;

ascertaining location information associated with the user equipment network device;

ascertaining timing information associated with the high bandwidth communication with said user equipment network device;

communicating access information to said user equipment network device via a control channel after obtaining the content, said access information comprising said timing information and an access code associated with said high bandwidth communication;

adjusting a power level of said high bandwidth communication based on said location information; and directionally emitting said high bandwidth communication toward said user equipment network device utilizing said direction information at about said power level via a high bandwidth data channel.

* * * * *